United States Patent [19]
Takamoto et al.

[11] Patent Number: 5,581,401
[45] Date of Patent: Dec. 3, 1996

[54] PORTABLE SCREEN ASSEMBLY FOR USE WITH A PROJECTOR

[75] Inventors: Hideo Takamoto, Chiba; Tsuyoshi Matsunaga, Tokorozawa, both of Japan

[73] Assignees: Izumi-Cosmo Co., Ltd., Osaka-fu; Casio Computer Co., Ltd., Tokyo-to, both of Japan

[21] Appl. No.: 418,019

[22] Filed: Apr. 6, 1995

[30] Foreign Application Priority Data

Jun. 20, 1994 [JP] Japan ................................. 6-136939
Nov. 11, 1994 [JP] Japan ................................. 6-277746

[51] Int. Cl.$^6$ ................................. G03B 21/56
[52] U.S. Cl. ................. 359/443; 359/450; 359/461; 396/3
[58] Field of Search ................. 359/443, 450, 359/461; 354/291

[56] References Cited

U.S. PATENT DOCUMENTS

| D. 366,055 | 1/1996 | Matsunaga et al. | D16/241 |
|---|---|---|---|
| 4,017,152 | 4/1977 | Allen | 350/117 |
| 4,169,658 | 10/1979 | Brown | 350/118 |
| 4,705,355 | 11/1987 | Espo | 350/117 |

FOREIGN PATENT DOCUMENTS

| 61-40409 | 10/1986 | Japan . |
|---|---|---|
| 5-94837 | 12/1993 | Japan . |

*Primary Examiner*—Safet Metjahic
*Assistant Examiner*—D. P. Malley
*Attorney, Agent, or Firm*—Wenderoth, Lind & Ponack

[57] ABSTRACT

A portable screen assembly for use with a projector has a housing made up of a lower casing and an upper casing pivotally mounted on the lower casing to open or close the lower casing. The housing accommodates a roll rotatably mounted on the lower casing, a screen wound around the roll, a hanger bar to which one side of the screen is connected, and two extension robe assemblies having respective first ends pivotally mounted on the lower casing for movement between folded-down positions and erected positions generally perpendicular to each other. The hanger bar extends parallel to the roll in a spaced relationship when accommodated within the housing, while the two extension robe assemblies extend, when in the folded-down positions, in line with each other in a direction parallel to the roll and in a spaced relationship thereto. A bar clip is mounted on a second end of each of the extension robe assemblies. When the screen assembly is in use, each of the extension robe assemblies is moved to and extended at the erected position, and the hanger bar is placed on and held by the bar clip so that the screen is stretched out between the hanger bar and the roll, with the extension tube assemblies positioned on both sides of the screen.

6 Claims, 8 Drawing Sheets

PORTABLE SCREEN ASSEMBLY FOR USE WITH A PROJECTOR

BACKGROUND OF THE INVENTION

1. Field of the Invention

The present invention relates to a portable screen assembly for displaying, on an enlarged scale, an image projected by a projector or a projection TV set.

2. Description of Related Art

An image projected by a projector or, in some cases, a projection TV set is generally displayed, on an enlarged scale, on a reflection type screen or a transmission type screen.

Of the reflection type screens, some are generally accommodated in a housing mounted on a ceiling or a side wall, and are electrically or manually stretched out as occasion demands. Hanging screens or screens with a tripod are used by hanging or locating them at a desired place.

Portable screen assemblies are today available in which a screen is wound around a roll housed in a housing. When such screen assemblies are in use, the housing is initially installed at a desired place, and the screen is subsequently stretched out by, for example, an extension pole means somewhat similar to a pantograph by the action of the biasing force of a spring mounted therein.

On the other hand, the transmission type screens are generally for business use and have a size greater than 80 inches. Most of these screens are, when in use, installed at a desired place on the floor, but are still required to be left on the floor, even when not in use.

As a matter of course, a screens that is accommodated in the housing mounted on the ceiling or the side wall cannot be removed to another place and, hence, cannot be used at any arbitrary place other than the presently set place. The screens of the type adapted to be placed on the floor are limited in installation place and are not handy to carry or to use in a relatively narrow space such as, for example, an ordinary home. Although such hanging screens are easy to carry, they need hooks, hangers or the like, and are also limited in installation place.

The portable screen assemblies accommodated in the housing are handy to carry, but conventional ones are relatively heavy and costly. Of the portable screen assemblies, those in which the screen is stretched out by the extension pole means similar to the pantograph are limited to the reflection type since the extension pole arrangement extends vertically across the screen at the center thereof.

SUMMARY OF THE INVENTION

The present invention has been developed to overcome the above-described disadvantages and is intended to provide an improved portable screen assembly which is relatively light and can be readily accommodated in a housing suitable for carrying.

Another objective of the present invention is to provide the portable screen assembly of the above-described type with which any one of the reflection type screen and the transmission type screen can be used at any arbitrary place or position.

In accomplishing the above and other objectives, the portable screen assembly according to the present invention comprises a housing having a lower casing and an upper casing pivotally mounted on the lower casing for selective opening and closure of the lower casing, a roll rotatably mounted on the lower casing, and a screen wound around the roll. The screen assembly also comprises a hanger bar to which one end of the screen is connected and two extension tube means having respective first ends pivotally mounted on the lower casing for movement between folded-down positions and erected positions generally perpendicular to each other, each of the extension tube means having a second end on which a clip means is mounted. The hanger bar extends parallel to the roll in a spaced relationship when accommodated within the housing, while the two extension tube means extend, when in the folded-down positions, in line with each other in a direction parallel to the roll in a spaced relationship thereto.

When the screen assembly is in use, each of the extension tube means is moved to and extended at the erected position, and the hanger bar is placed on and held by the clip means so that the screen is stretched out between the hanger bar and the roll, with the extension tube means positioned on both sides of the screen.

Because all the elements required to stretch out the screen can be accommodated in the housing, the screen assembly can be readily carried and can be used at any desired place. Also, because the hanger bar to which one side of the screen is connected is carried by the two extension tube means, no members cross the screen. Accordingly, any one of a reflection type screen and a transmission type screen can be incorporated in the screen assembly of the present invention.

Advantageously, each of the extension tube means comprises a bottom tube, a plurality of extension tubes telescopically slidably accommodated in the bottom tube, and a plurality of tube grips each pivotally mounted on one of the bottom tube and the extension tubes to fix the extension tubes.

This structure facilitates extension of the extension tube means and also facilitates fixing of the extension tubes relative to the bottom tube.

Conveniently, the screen assembly comprises a plurality of legs rotatably mounted on the lower casing and a biasing means for biasing each of the legs towards the lower casing. The legs are rotatable between first positions, where the legs extend longitudinally of the lower casing in alignment with each other, and second positions generally perpendicular to the first positions.

When the screen assembly is in use, each leg is pulled against the biasing force of the biasing means and is rotated to the second position, to thereby stably hold the whole screen assembly.

Preferably, a partition wall is interposed between the roll and the extension tube means to avoid interference of the screen with the extension tube means.

Conveniently, the screen is integrally formed with a skirt portion having a dot pattern formed by printing. The provision of the skirt portion enables remote control of a projector or any other device placed behind the screen assembly through the skirt portion.

Again conveniently, the clip means is rotatable within a given angular range with respect to the associated extension tube means. By so doing, an undesired twist of the screen caused by a twist of the erected extension tube means can be removed by appropriately rotating the clip means.

Advantageously, a plurality of distortion removing members are detachably mounted on the tube grips to remove distortion of the stretched screen.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

There is known a video projector of a type employing at least one liquid crystal light valve or display panel. This known video projector comprises, in addition to the liquid crystal display panel, a light source, an optical system for converting light from the light source into a specific flux of light, and a magnifying optical system. The liquid crystal display panel is utilized for displaying a video image formed thereon in any known manner, and the light passing through the liquid crystal display panel is modulated to provide an image carrier beam which is subsequently projected onto a screen to form a viewable image. If the liquid crystal display panel is driven by a televised video signal and, also, if the screen is built in a cabinet accommodating the projector, the resultant projector assembly is known as a projection TV set.

A portable screen assembly according to the present invention is adapted to be placed, for example, in front of the projector at a location spaced a given distance therefrom so that the image projected by the projector may be formed, on an enlarged scale, on the screen. The screen may be used as either a transmission type in which case viewers occupy a position on one side of the screen opposite to the projector, or a reflection type in which case viewers occupy a position on the same side as the projector. The distance between the screen and the projector generally depends upon the kind and size of the projector.

Figure 1:
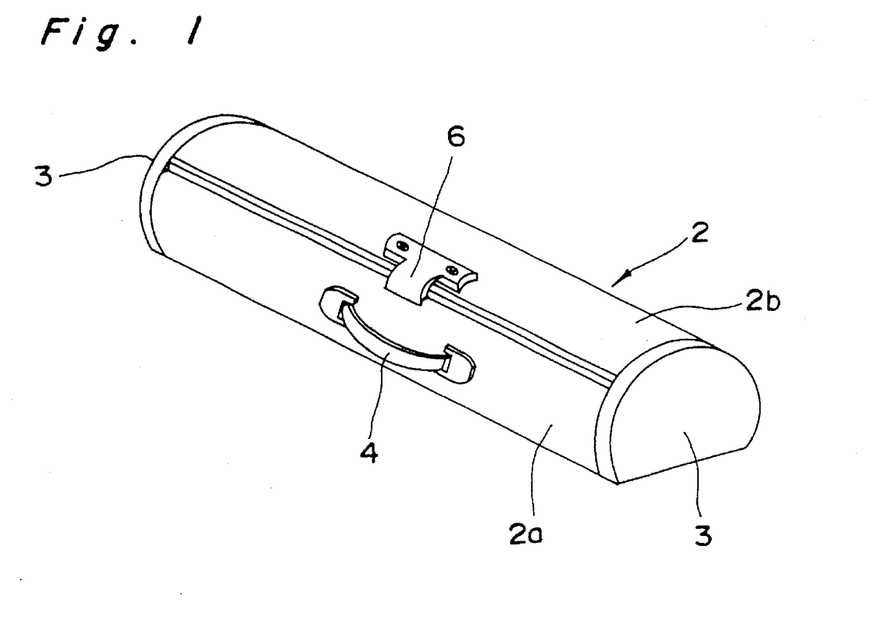
FIG. 1 is a perspective view of a housing in which a screen assembly of the present invention is accommodated.

Referring now to the drawings, there is shown in FIG. 1 a generally Quonset-shaped housing 2 made of, for example, aluminum. This housing 2 accommodates therein a screen for displaying the image formed by the projector, a spring-biased roll for winding the screen therearound, extension tube assemblies for holding the screen substantially vertically, and their associated component parts. The housing 2 has a handle 4 with which the screen assembly can be carried from place to place.

Figure 2:
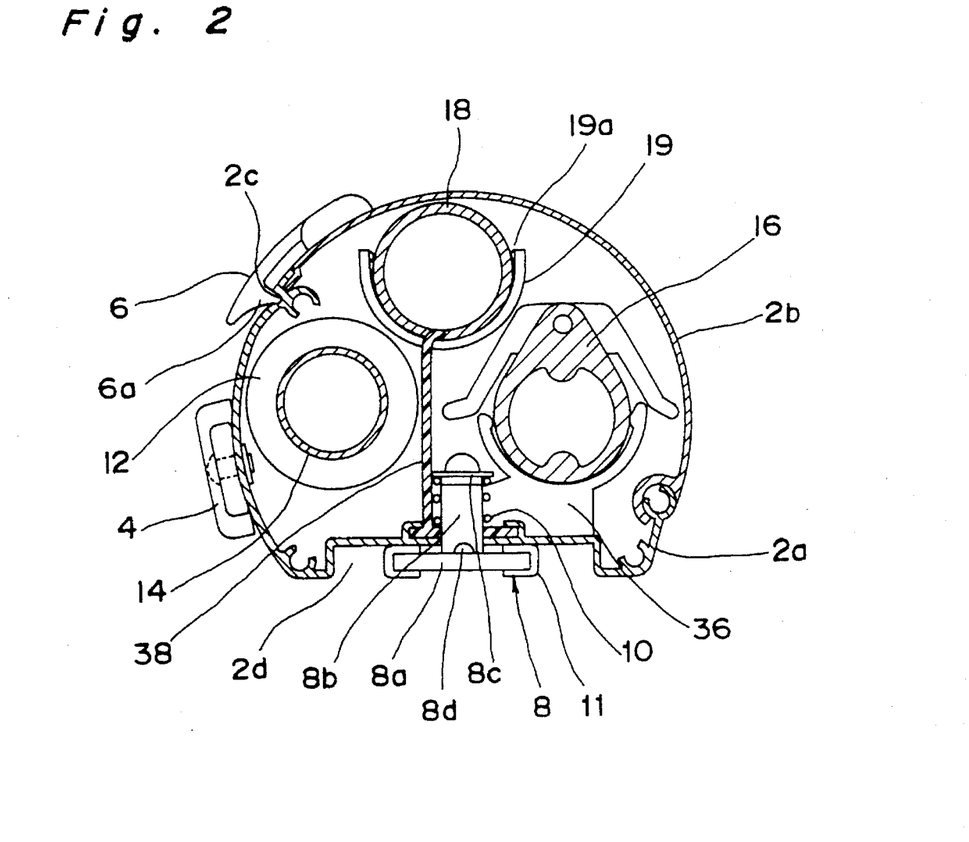
FIG. 2 is a vertical sectional view of the screen assembly.

As shown in FIGS. 1 and 2, the housing 2 is comprised of a lower casing 2a, an upper casing 2b hingedly connected to the lower casing 2a, and end covers 3 secured to respective ends of the lower casing 2a. The upper casing 2b has a lock 6 secured to a generally intermediate portion of one of the opposite sides thereof which is remote from the side hingedly connected to the lower casing 2a. The lock 6 has a hooked portion 6a which is engageable with a recess 2c defined in the lower casing 2a at an upper edge of a side wall thereof. When the screen assembly is not in use, the upper casing 2b is closed with the lock 6 engaged in the recess 2c by its own resiliency. When the screen assembly is to be used, the upper casing 2b can be opened by manually disengaging the lock 6 from the recess 2c.

It is to be noted here that although a single lock 6 is illustrated in FIG. 1, two or three locks may be secured to the upper casing 2b, and the specific number of the locks may be determined appropriately in consideration of the size and/or weight of the screen assembly.

The lower casing 2a has two legs 8 rotatably mounted on a bottom wall thereof and mutually spaced in a direction longitudinally thereof. Each of the legs 8 has an elongated support plate 8a and a rod 8b secured to the support plate 8a so as to extend through the bottom wall of the lower casing 2a. A coil spring 10, having one end held in contact with the bottom wall of the lower casing 2a and the other end held in contact with a washer 8c secured to a free end of the rod 8b, is mounted around the rod 8b to bias the associated leg 8 upwardly. When the screen assembly is not in use, the support plates 8a of the legs 8 are stored in a recess defined in the bottom wall of the lower casing 2a so as to extend longitudinally thereof. When the screen assembly is to be used, the support plates 8a are first pulled downwardly as viewed in FIG. 2 and subsequently rotated by an angle of 90° from rested positions to hold the whole screen assembly stably at a desired location. Each of the support plates 8a has two hemispherical projections 8d formed on the upper surface thereof and equally spaced from the rod 8b. When the support plates 8a are rotated by 90° from the rested positions, the hemispherical projections 8d are brought into engagement with associated external edges of the lower casing 2a for positioning of the support plates 8a (see FIG. 4). Opposite ends of each support plate 8a are covered with respective rubber caps 11 for protection of a surface where the screen assembly is placed.

Figure 3:
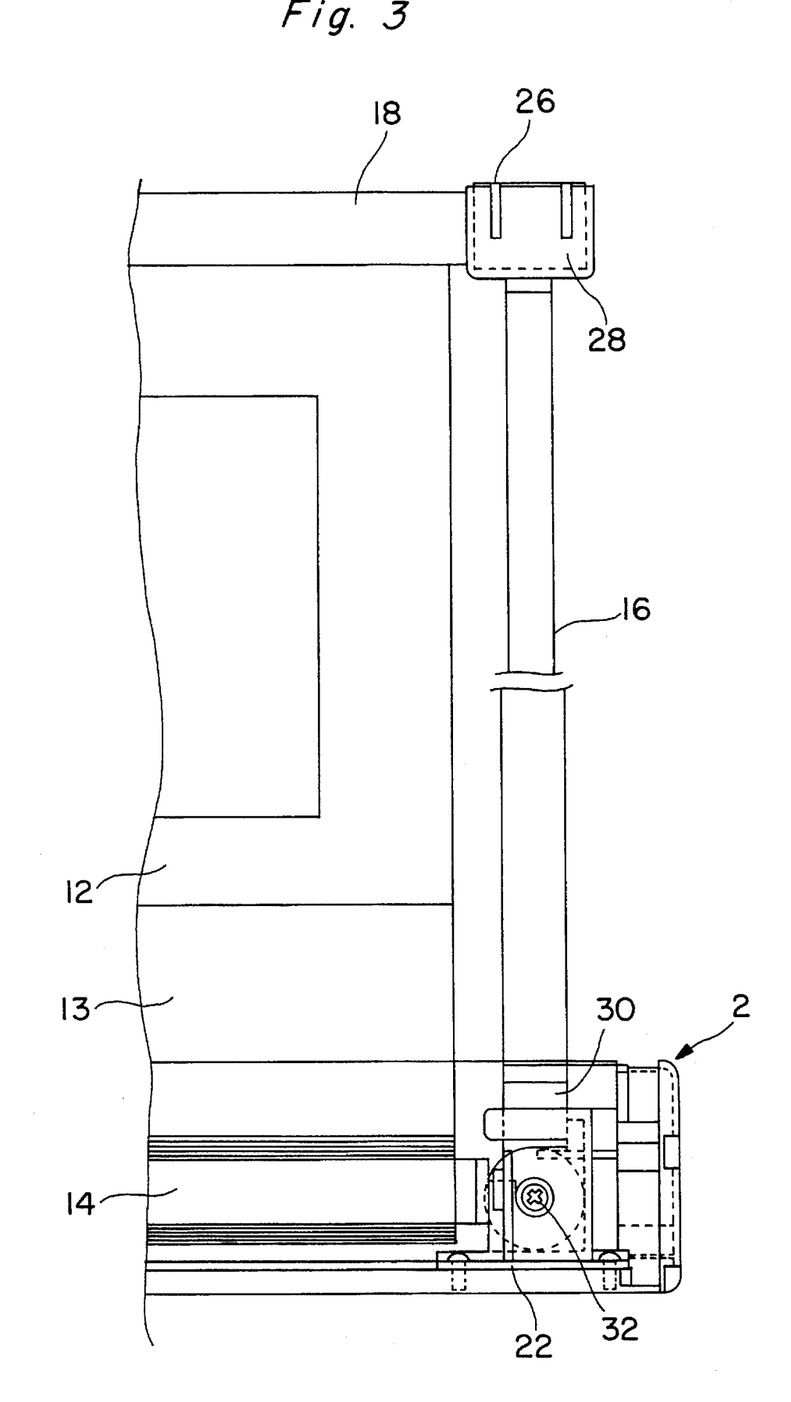
FIG. 3 is a fragmentary front elevational view of the screen assembly when in use.
Figure 4:
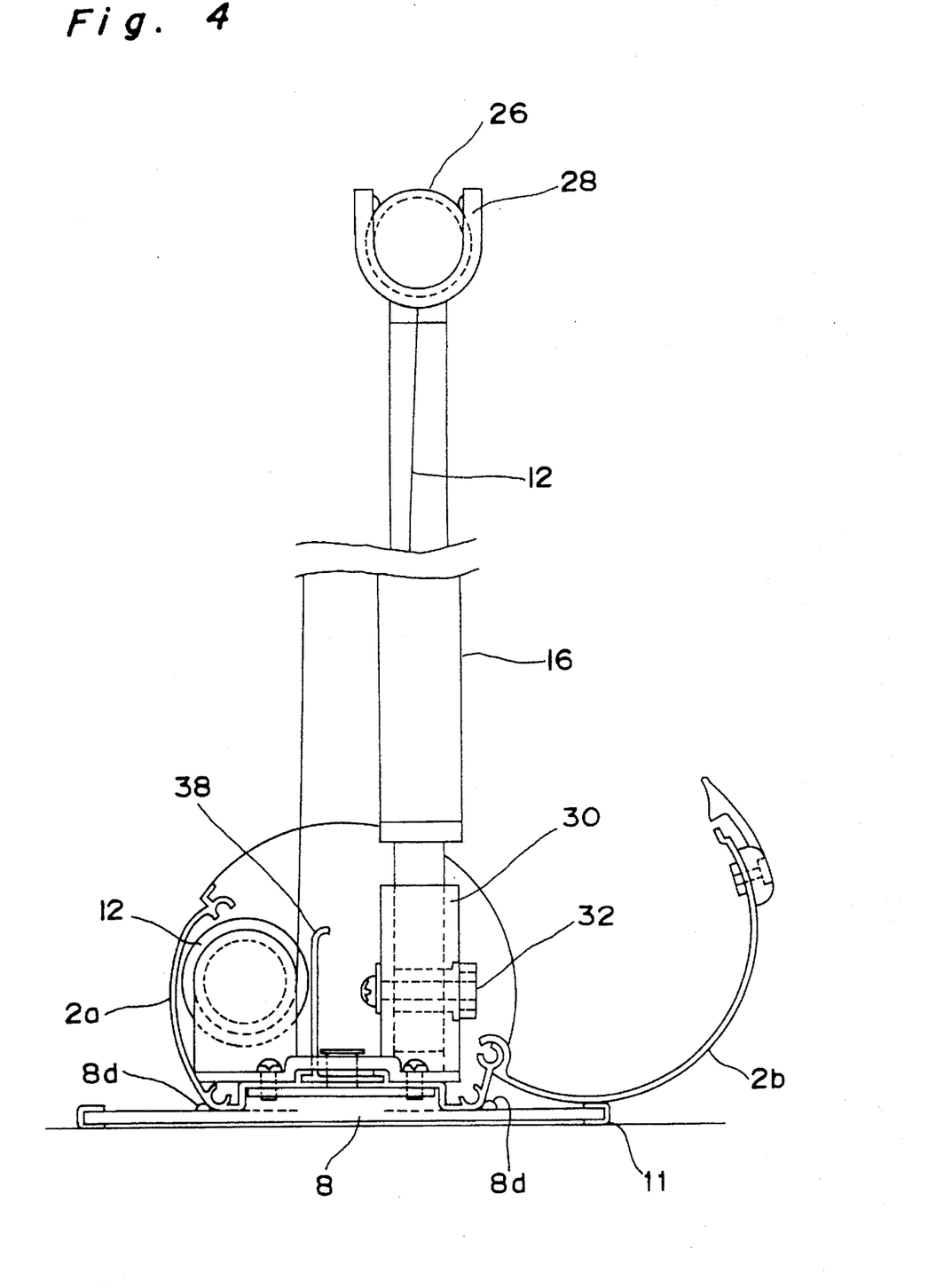
FIG. 4 is a fragmentary side elevational view of the screen assembly of FIG. 3.

As shown in FIGS. 2, 3 and 4, the housing 2 accommodates a spring-biased roll 14 around which a screen 12 and a skirt portion 13, both integrally formed with each other, are wound, two extension tube assemblies 16 for holding the screen 12 and the skirt portion 13 in a substantially vertically stretched fashion, and a hanger bar 18 to which the upper edge of the screen 12 is secured or otherwise bonded. The two extension tube assemblies 16 extend longitudinally of the housing 2 in line with each other and are held substantially on the same level above the bottom wall of the lower casing 2a as the spring-biased roll 14 while extending parallel to the roll 14. The hanger bar 18 is disposed obliquely upwardly of both the spring-biased roll 14 and the extension tube assemblies 16. Partly because the spring-biased roll 14, the extension tube assemblies 16, and the hanger bar 18 are arranged in the housing 2 in the above relationship and partly because the length of the extension tube assemblies 16 is minimized in the housing 2, the housing 2 can be made small and compact.

When accommodated in the housing 2, opposite ends of the hanger bar 18 are received by associated bar receivers 19 extending from respective end covers 3 in a direction perpendicular thereto. Each end of the hanger bar 18 is securely held in the bar receiver 19 by means of opposed projections 19a protruding inwardly from upper edges of the associated receiver 19.

Figure 5:
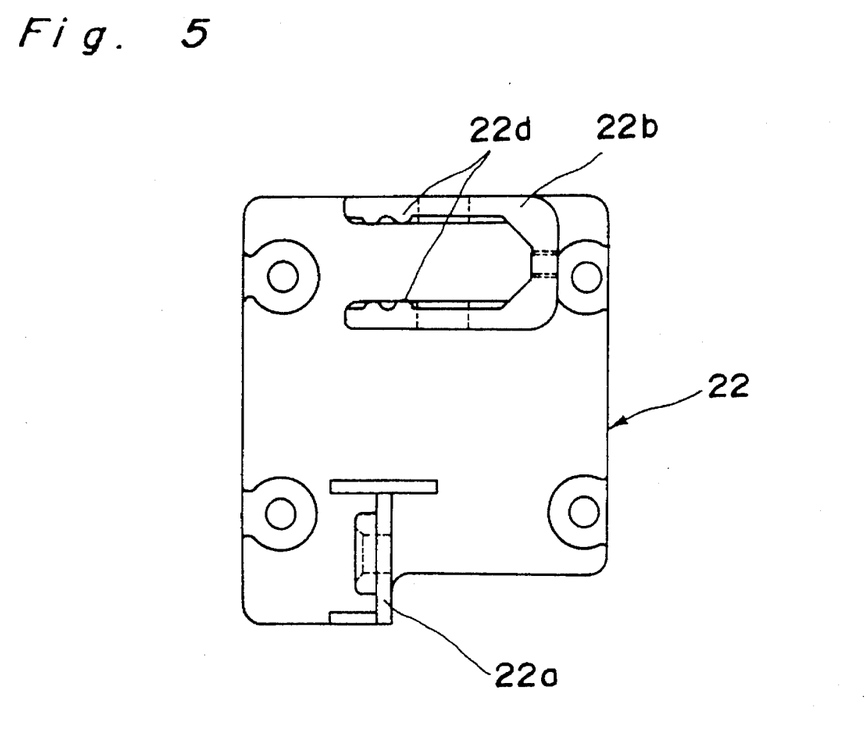
FIG. 5 is a top plan view of a bracket for carrying an extension tube assembly and a spring-biased roll both mounted in the screen assembly.
Figure 6:
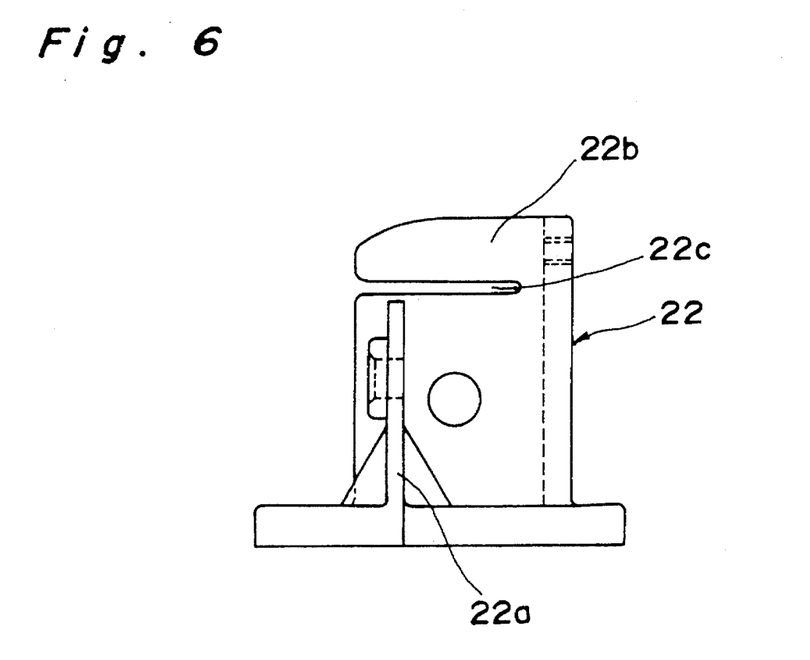
FIG. 6 is a side elevational view of the bracket of FIG. 5.

The spring-biased roll 14 is a hollow cylindrical member, and opposite ends thereof are rotatably mounted on spaced brackets 22, one of which is shown in FIGS. 5 and 6, via bearings (not shown), respectively. The lower edge of the skirt portion 13 is bonded to the spring-biased roll 14 over the length thereof by the use of a double-sided adhesive tape. When accommodated in the housing 2, most of the screen 12 and the entire skirt portion 13 are wound around the spring-biased roll 14. Because the spring-biased roll 14 is always biased so as to rotate in a specific direction by a coil spring (not shown) accommodated therein, the spring-biased roll 14 applies a desired tension to the screen 12 and the skirt portion 13 when the screen assembly is in use, and also facilitates winding of the screen 12 and the skirt portion 13 around the spring-biased roll 14 when they are desired to be wound up.

The brackets 22 are secured to the bottom wall of the lower casing 2a, and each of them is made up of a roll bracket 22a in the form of a plate and an extension tube bracket 22b having a generally U-shaped horizontal section to carry the spring-biased roll 14 and the associated extension tube assembly 16, respectively. As shown in FIGS. 5 and 6, each of the extension tube brackets 22b has opposed side walls, each of which has a horizontally extending slit 22c defined therein and corrugations 22d formed on the inner surface thereof above the slit 22c.

Figure 7:
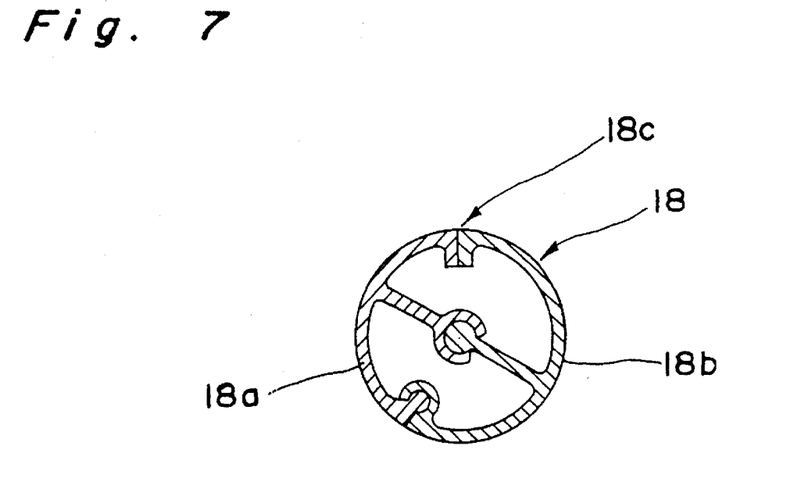
FIG. 7 is a vertical sectional view of a hanger bar mounted in the screen assembly.

As shown in FIG. 7, the hanger bar 18 is a hollow cylindrical member made up of a first bar segment 18a and a second bar segment 18b, each of which is made of, for example, aluminum. The first and second bar segments 18a and 18b are held in engagement with each other over the length thereof at central and circumferential portions thereof. Opposed side edges of the first and second bar segments 18a and 18b constitute a clamp 18c to firmly hold the upper edge of the screen 12 therebetween. Opposite ends of the hanger bar 18 are covered with respective caps 26.

It is to be noted that although the lower edge of the skirt portion 13 has been described as being bonded to the spring-biased roll 14 by the double-sided adhesive tape, the former may be secured to the latter, in a manner similar to the securing of the upper edge of the screen 12.

It is also to be noted that the hanger bar 18 is not limited to be of the two-piece construction shown in FIG. 7, but may be a hollow cylindrical member of one-piece construction. In this case, the upper edge of the screen 12 is bonded to the hanger bar 18 by means of, for example, a double-sided adhesive tape.

Figure 8:
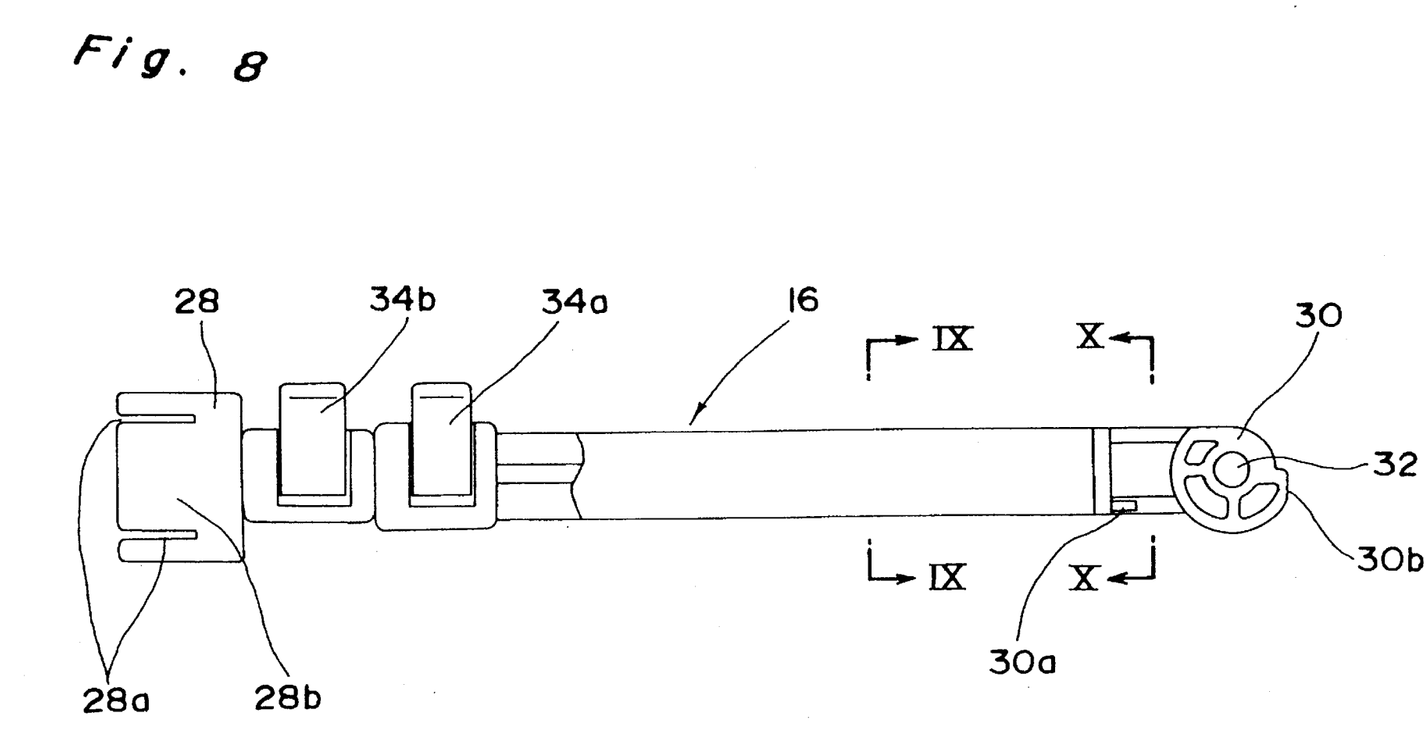
FIG. 8 is a front view of the extension tube assembly when accommodated in the housing.
Figure 9:
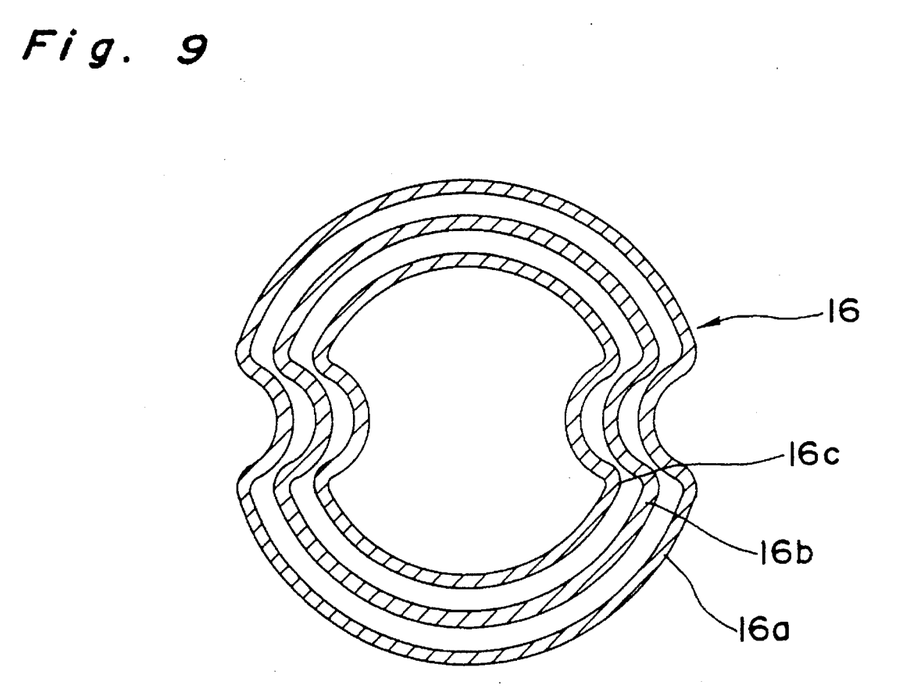
FIG. 9 is a sectional view taken along line IX—IX in FIG. 8.

FIGS. 8 and 9 depict one of the two extension tube assemblies 16 of substantially identical construction. As will be later described in detail, the extension tube assemblies 16 are supported by the lower casing 2a for pivotal movement between an erected position, substantially as shown in FIGS. 3 and 4, and a folded-down position in which, as shown in FIG. 2 and as described above, the extension tube assemblies 16 are held in line with each other. Each extension tube assembly 16 comprises a bottom tube 16a, a first extension tube 16b telescopically slidably accommodated in the bottom tube 16a, a second extension tube 16c telescopically slidably accommodated in the first extension tube 16b, a first tube grip 34a pivotally mounted on the distal end of the bottom tube 16a, and a second tube grip 34b pivotally mounted on the distal end of the first extension tube 16b. As best shown in FIG. 9, each of the tubes 16a, 16b and 16c has two grooves defined therein and extending longitudinally on opposite sides thereof to avoid relative rotation of the tubes 16a, 16b and 16c. A bar clip 28 is secured to the distal end of the second extension tube 16c, while the proximal end of the bottom tube 16a opposite to the bar clip 28 is secured to a tube carrier 30 rotatably mounted on the extension tube bracket 22 by means of a pin 32. The first tube grip 34a accommodates a cam mechanism (not shown) to fix the first extension tube 16b to the bottom tube 16a at a desired position, while the second tube grip 34b accommodates a cam mechanism (not shown) to fix the second extension tube 16c to the first extension tube 16b at a desired position. The first and second extension tubes 16b and 16c are provided at their proximal ends with respective stoppers (not shown) to avoid accidental removal thereof from the bottom tube 16a and the first extension tube 16b, respectively.

It is to be noted here that although each of the extension tube assemblies 16 has been described as having the first and second extension tubes 16b and 16c, it may have three extension tubes. The number of extension tubes is appropriately determined according to the size of the screen 12.

Figure 10:
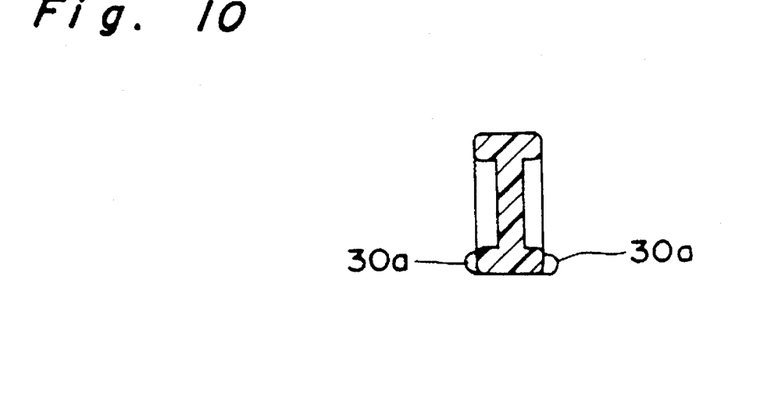
FIG. 10 is a sectional view taken along line X—X in FIG. 8.

As shown in FIGS. 8 and 10, the tube carrier 30 has two projections 30a formed on opposite side surfaces thereof at locations spaced a given distance radially from the pin 32. The two projections 30a have a generally semicircular section, and when each extension tube assembly 16 is erected upright, the projections 30a are brought into engagement with the associated corrugations 22d shown in FIG. 5 to hold the extension tube assembly 16 in the erected position. At this moment, a flat portion 30b, formed on the tube carrier 30 opposite to the bottom tube 16a, is held in contact with the upper surface of the bracket 22, to thereby stably hold the extension tube assembly 16.

Figure 11:
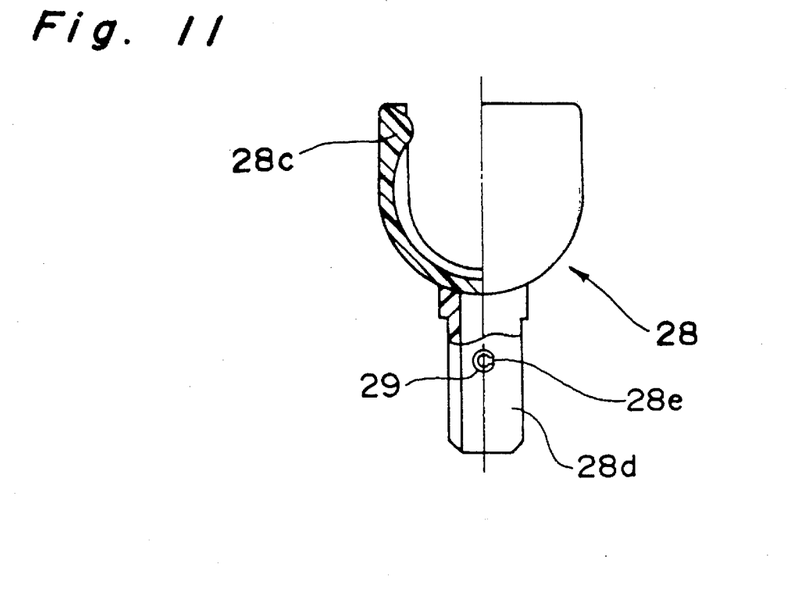
FIG. 11 is a partial sectional view of a bar clip mounted on the distal end of the extension tube assembly.

The bar clip 28, secured to the distal end of the second extension tube 16c, has opposed side walls, each of which has two slits 28a defined therein in a direction parallel to the direction in which the extension tube assembly 16 extends. Those portions of the side walls that are interposed between associated two slits 28a constitute a clip portion 28b for holding one of the caps 26 of the hanger bar 18.

As shown in FIG. 11, the clip portion 28b has opposed projections 28c protruding inwardly therefrom and each interposed between the two slits 28a at an open edge thereof. Because the spacing between the projections 28c is slightly smaller than the diameter of the cap 26, the clip portion 28b is slightly broadened to receive the cap 26 therein to hold the latter, when the cap 26 is pressed downwards against the bar clip 28 with the extension tube assembly 16 held in the erected position.

The bar clip 28 also has a carrier shaft 28d inserted into the second extension tube 16c, an opening 28e defined in the carrier shaft 28d and extending radially thereof, and a spring pin 29 pressed into the opening 28e. Because one end of the spring pin 29 is in engagement with an elongated opening (not shown) defined in the second extension tube 16c, the bar clip 28 is held by the second extension tube 16c so as to be rotatable within the range of a predetermined angle.

Figure 12:
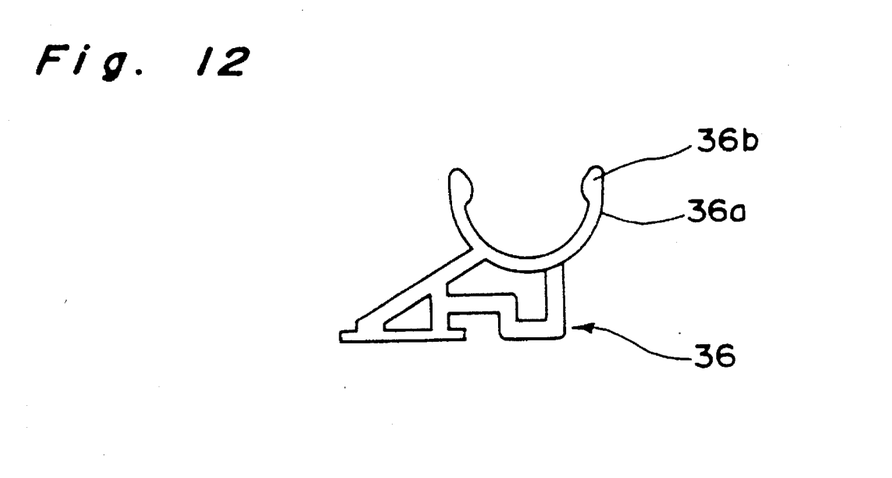
FIG. 12 is a side elevational view of a tube holder for holding the extension tube assembly accommodated in the housing.

As shown in FIG. 2, each extension tube assembly 16 is, when held in the folded-down position, received by a tube holder 36 shown in FIG. 12. The tube holder 36 is securely mounted on the bottom wall of the lower casing 2a and has opposed side walls 36a having respective inwardly protruding projections 36*b*. Because the spacing between the projections 36*b* is slightly smaller than the outer diameter of the bottom tube 16*a*, the opposed side walls 36*a* are slightly broadened to receive the bottom tube 16*a* therein to hold the latter, when the bottom tube 16*a* is pressed downwards against the tube holder 36.

As shown in FIGS. 2 and 4, a partition wall 38 is interposed between the spring-biased roll 14 and the two extension tube assemblies 16 to avoid interference of the screen 12 and the skirt portion 13, then wound around the former, with the first and second tube grips 34*a* and 34*b* of the latter.

However, the partition wall 38 is not necessarily required and can be eliminated or removed by appropriately selecting the mounting position of the tube grips 34*a* and 34*b*.

It is preferred that a PET film-based diffusing film for diffusing a back light from a LCD is used for the screen 12, but the material of the screen 12 is not limited thereby. Upon appropriate selection of the material of the screen 12, the portable screen assembly of the present invention can be used as a transmission type screen assembly or a reflection type screen assembly.

More specifically, in the case where the upper edge of the screen 12 and the lower edge of the skirt portion 13 are bonded to the hanger bar 18 and the spring-biased roll 14, respectively, by double-sided adhesive tape, the portable screen assembly of the present invention can be used as the transmission or reflection type screen assembly by exchanging only the screen 12 together with the skirt portion 13. On the other hand, in the case where the upper edge of the screen 12 and the lower edge of the skirt portion 13 are secured to the hanger bar 18 and the spring-biased roll 14, respectively, the portable screen assembly of the present invention can be used as the transmission or reflection type screen assembly by exchanging the screen 12 and the skirt portion 13 together with the hanger bar 18 and the spring-biased roll 14.

The skirt portion 13, integrally formed with the screen 12, has a dot pattern made up of, for example, a large number of dots having a diameter of 0.5 millimeters and spaced both horizontally and vertically at regular intervals of 3 millimeters. The dot pattern is formed, for example, by printing the entire surface of the skirt portion 13 except for the dots.

Figure 13:
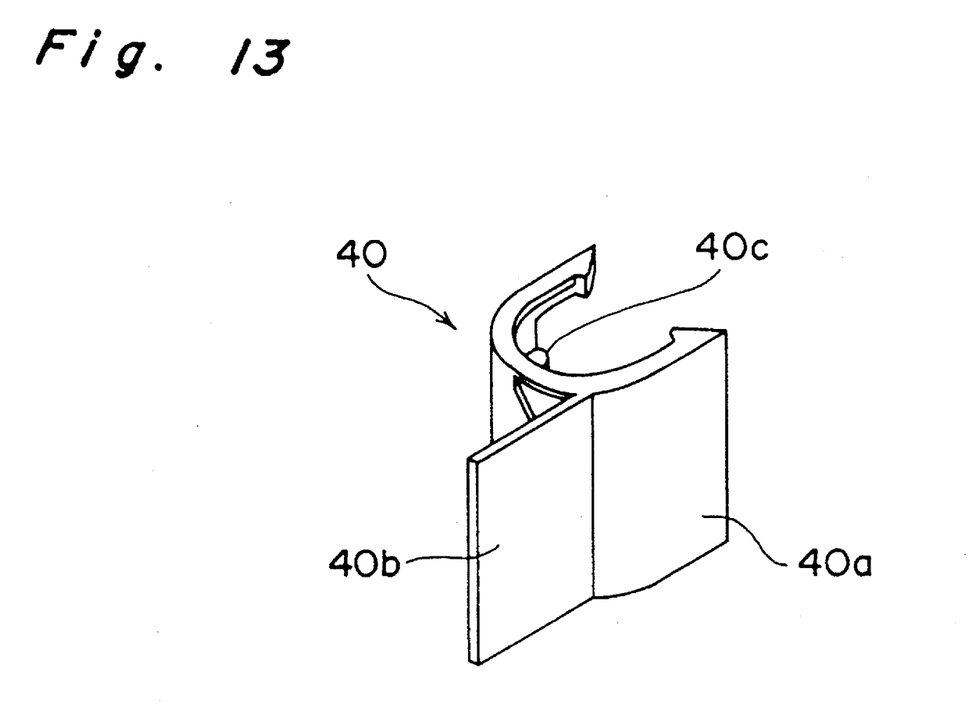
FIG. 13 is a perspective view of a flatter to be mounted on the extension tube assembly.

FIG. 13 depicts a distortion removing member in the form of a flatter 40 for removing distortion or deflection of the screen 12 and the skirt portion 13 at the time they are stretched out between the hanger bar 18 and the spring-biased roll 14. The flatter 40 has a generally U-shaped mounting portion 40*a* and a generally flat contact portion 40*b* integrally formed with the mounting portion 40*a*. As occasion demands, the mounting portion 40*a* is mounted on one of the tube grips 34*a* and 34*b* so that the contact portion 40*b* may be brought into contact with the screen 12 or the skirt portion 13 to remove distortion or deflection thereof. The flatter 40 also has a semicircular projection 40*c* formed inside the mounting portion 40*a* at the center thereof. When the flatter 40 is mounted on one of the tube grips 34*a* and 34*b*, the projection 40*c* is received in one of the aforementioned grooves of the latter to thereby avoid an undesired rotation of the flatter 40.

When the screen assembly of the above-described construction is to be used, the support plates 8*a* of the two rotatable legs 8 are first pulled downwardly as viewed in FIG. 2 and subsequently rotated by an angle of 90° so that the whole screen assembly is installed stably at a location spaced a predetermined distance from and ahead of a projector or a projection TV set.

The upper casing 2*b* is then opened upon disengagement of the lock 6 thereof. Thereafter, each extension tube assembly 16 is rotated from its folded-down position to its erected position until the projections 30*a* of the tube carrier 30 are engaged with the corrugations 22*d* of the tube bracket 22*b*, thereby setting the extension tube assembly 16 in the erected position. The second extension tube 16*c* is then telescopically lifted to a predetermined position by loosening the second tube grip 34*b* and is fixed to the first extension tube 16*b* by locking the second tube grip 34*b*. Likewise, the first extension tube 16*b* is telescopically lifted to a predetermined position by loosening the first tube grip 34*a* and is fixed to the bottom tube 16*a* by locking the first tube grip 34*a*.

Thereafter, the hanger bar 18 is removed from the bar receivers 19 and is lifted along with the screen 12 and the skirt portion 13 while being held substantially horizontally. The two caps 26 of the hanger bar 18 are then pressed downwardly into the associated bar clips 28 so that the hanger bar 18 may be stably carried by the bar clips 28. At this moment, a desired tension is applied to the screen 12 and the skirt portion 13, because the spring-biased roll 14 is always biased by the coil spring accommodated therein in one specific direction in which the screen 12 and the skirt portion 13 are wound therearound.

If the screen 12 and the skirt portion 13 are twisted to some extent due to an undesired twist of the erected extension tube assembly 16, the twist of the former can be removed by appropriately rotating the bar clips 28 within the range of the predetermined angle.

Furthermore, when the screen 12 and the skirt portion 13 wound around the spring-biased roll 14 are lifted, opposite vertical edges thereof are freed, and the screen 12 and the skirt portion 13 tend to distort as a whole. However, such a distortion can be removed by mounting a required number of distortion remaining members or flatters 40 on the tube grips 34*a* and 34*b* so that the contact portions 40*b* of the former may be brought into contact with front or rear surfaces of the screen 12 or the skirt portion 13. The use of the flatters 40 is also effective against an undesirable sway of the screen 12 and the skirt portion 13 which is occasionally caused by the wind.

Also, as discussed previously, because the skirt portion 13 is formed with the dot pattern, the projector or any other device placed behind the screen assembly can be remote-controlled through the skirt portion 13.

When the screen assembly is desired to be folded down into the housing 2, all the elements are accommodated in the housing 2 in a sequence reverse to the sequence of erection.

As is clear from the above, because all the elements required to stretch out the screen can be accommodated in the housing, the screen assembly of the present invention is very convenient to carry and can be placed at any desired place.

Furthermore, because each of the extension tube assemblies is comprised of a plurality of telescopic tubes, the extension tube assemblies can be accommodated in a relatively small housing and can be readily extended in readiness for the support of the screen. The provision of the tube grips with the cam mechanism facilitates fixing of the telescopic tubes.

Also, when the rotatable legs are in the folded-down positions on the lower casing, they would not constitute any obstruction to the user who is going to carry the screen assembly. The legs can stably support the whole screen assembly at any desired place upon rotation thereof.

The partition wall interposed between the roll and the extension tube assemblies avoids damage to the screen during erection or when all the elements are folded down into the housing.

Because the screen is integrally formed with the skirt portion having a dot pattern formed by printing, a projection TV set, a projector, a video recorder or the like placed behind the screen assembly can be remote-controlled through the skirt portion, thus enhancing the controllability of the devices.

Furthermore, if the screen and the skirt portion are twisted to some extent by a twist of the erected extension tube assembly, such a twist can be removed by appropriately rotating one or both of the bar clips. As a result, a clean image can be projected on the screen.

Also, as occasion demands, a plurality of flatters can be detachably mounted on the tube grips to remove an undesirable distortion of the stretched screen or a sway of the stretched screen caused by the wind. Accordingly, the quality of the image projected on the screen is not deteriorated.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A portable screen assembly for use with a projector, said assembly comprising:

a housing having a lower casing and an upper casing pivotally mounted on said lower casing for selective opening and closure of said lower casings;

a roll rotatably mounted on said lower casing;

a screen wound around said roll;

a hanger bar to which one end of said screen is connected, said hanger bar extending parallel to said roll in spaced relationship thereto when accommodated within said housing;

two extension tube means having respective first ends pivotally mounted on said lower casing for movement between respective folded-down positions and respective erected positions generally perpendicular to said folded-down positions, said two extension tube means extending, when in said folded-down positions, in alignment with each other in a direction parallel to said roll and in spaced relationship thereto, each said extension tube means comprising a plurality of tubes including a bottom tube and plural extension tubes telescopically slidably accommodated in said bottom tube, and a plurality of tube grips, each said tube grip being pivotally mounted on a respective one of said plurality of tubes to fix said one respective tube to a respective adjacent said extension tube; and a clip means mounted on a second end of each of said extension tube means;

whereby, when said screen assembly is in use, each of said extension tube means is moved to and extended at the respective said erected position thereof, and said hanger bar is placed on and held by said clip means so that said screen is stretched out between said hanger bar and said roll, with said extension tube means positioned on opposite sides of said screen.

2. The screen assembly according to claim 1, and further comprising a plurality of legs rotatably mounted on said lower casing and a biasing means for biasing each of said legs towards said lower casing, said legs being rotatable between first positions, where said legs extend longitudinally parallel to said lower casing in alignment with each other, and second positions generally perpendicular to said first positions, wherein, when said screen assembly is top be used each of said legs is pulled against a biasing force of said biasing means and is rotated to said second position.

3. The screen assembly according to claim 1, and further comprising a partition wall secured to said lower casing and interposed between said roll and said extension tube means to avoid interference of said screen with said extension tube means.

4. The screen assembly according to claim 1, and further comprising a skirt portion integrally formed with said screen, said skirt portion having a dot pattern formed by printing.

5. The screen assembly according to claim 1, wherein said clip means is rotatable within a given angular range with respect to said associated extension tube means.

6. The screen assembly according to claim 1, and further comprising a plurality of distortion removing members each detachably mounted on one of said tube grips to remove distortion of said screen when said screen is stretched out between said hanger bar and said roll.

* * * * *